Sept. 17, 1957 H. A. GEHRES 2,806,750
PISTON AND PISTON RING CONSTRUCTION
Filed June 6, 1955 2 Sheets-Sheet 1

INVENTOR.
HEWITT A. GEHRES
BY Owen & Owen
ATTORNEYS

Sept. 17, 1957  H. A. GEHRES  2,806,750
PISTON AND PISTON RING CONSTRUCTION
Filed June 6, 1955  2 Sheets-Sheet 2
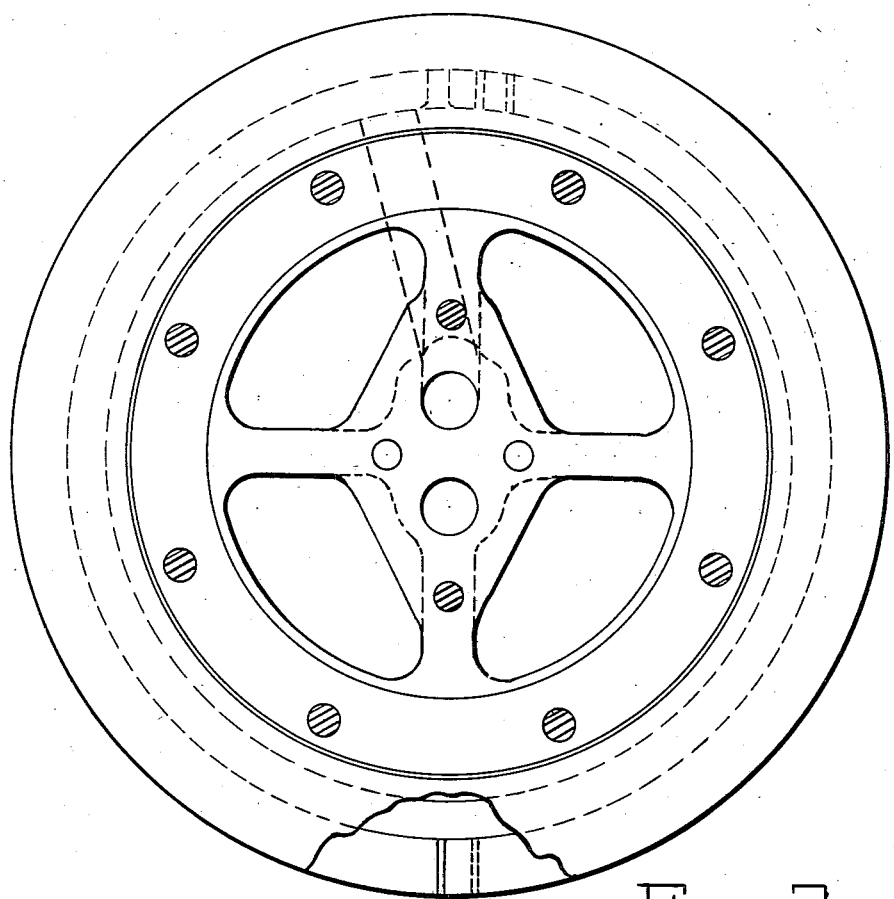
FIG_2_
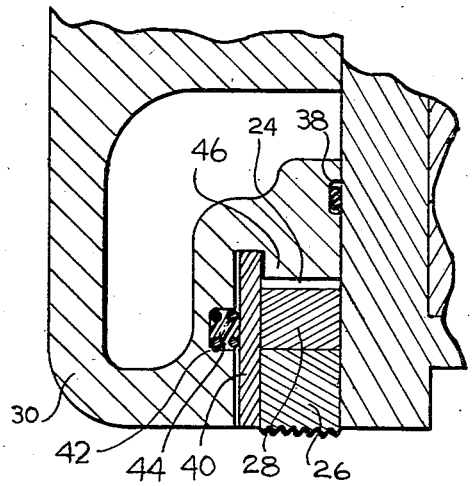
FIG_3_
INVENTOR.
HEWITT A. GEHRES
BY
Owen & Owen
ATTORNEYS

United States Patent Office 2,806,750
Patented Sept. 17, 1957

2,806,750

PISTON AND PISTON RING CONSTRUCTION

Hewitt A. Gehres, Mount Vernon, Ohio, assignor to The Cooper-Bessemer Corporation, Mount Vernon, Ohio, a corporation of Ohio Application June 6, 1955, Serial No. 513,335

3 Claims. (Cl. 309—7)

This invention relates to pistons for internal combustion engines, and to a novel piston ring construction forming a part thereof.

At the present time the majority of piston rings operate on the principle that gas pressure in the ring groove assists in forcing the ring out against the walls of the cylinder to form a seal. It has been found that in certain types of engines the unit pressure that is built up behind the piston ring is so high that scoring of the cylinder walls occurs, and ring failure sometimes results. Attempts to solve the problem by changing the resiliency and form of the ring have not been successful. The present invention departs from prior practices and deliberately seals off the space in the ring groove behind the ring and relies on a stiff and heavy ring and backing spring for the sealing force against the cylinder wall.

The primary object of the invention is to improve the life and performance of piston rings in engines having high peak cylinder pressures.

Another object of the invention is to provide a piston and piston ring construction in which the ring groove constitutes a valved space in which a relatively low pressure is maintained and which is automatically discharged whenever its pressure prevails over the pressure on the outside of the ring groove.

Still another object of the invention is to provide a piston and piston ring construction which is relatively easy to assemble and maintain.

Other objects and advantages of the invention will become apparent from the following specification, reference being had to the accompanying drawings in which:

Fig. 2 is a section on line 2—2 of Fig. 1; and

Fig. 3 is an enlarged fragmentary sectional view of the top portion of a piston embodying the ring construction according to the present invention in somewhat modified form.

Figure 1:
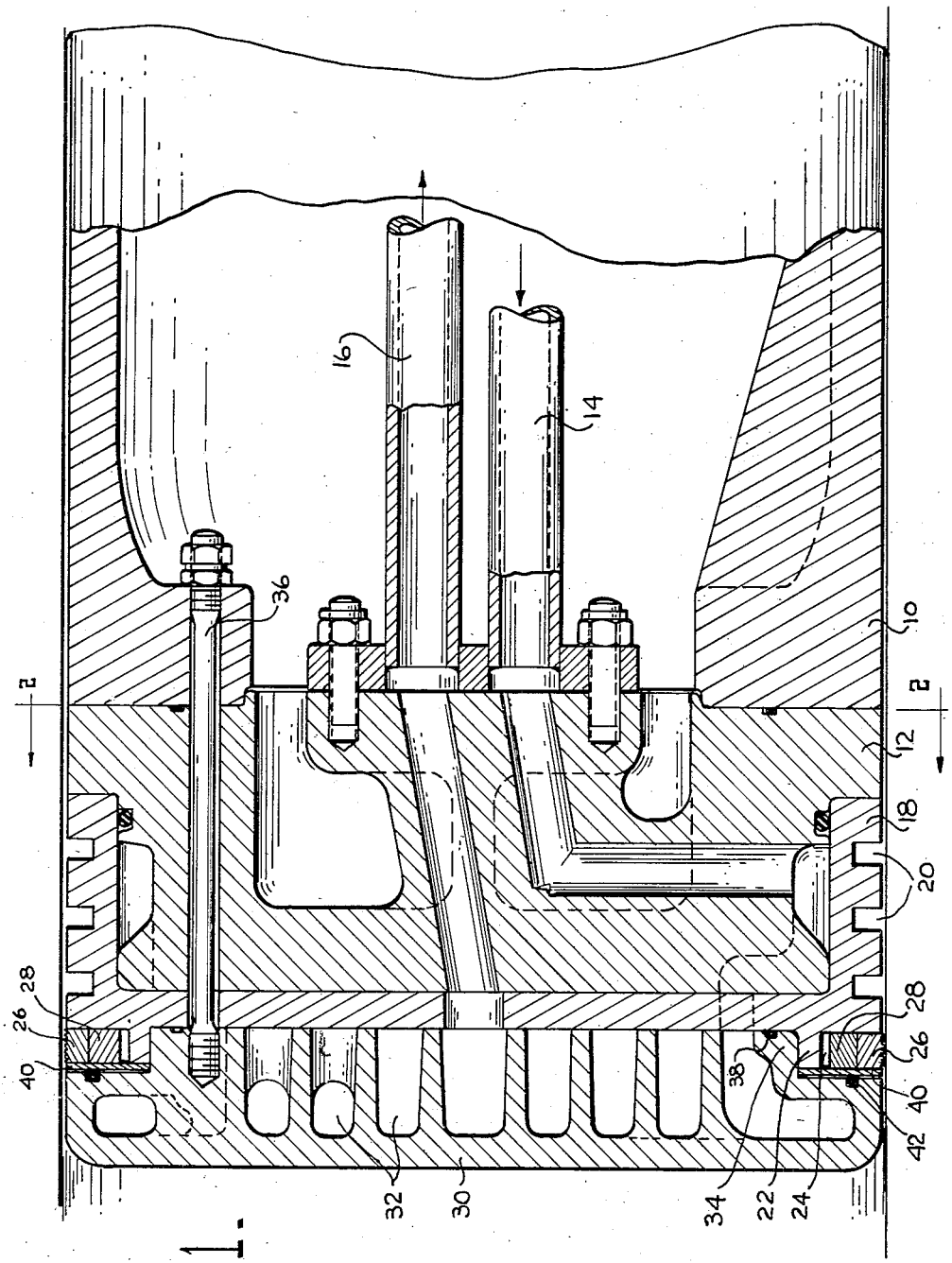
Figure 1 is a fragmentary central vertical sectional view of a piston embodying the present invention.

Referring to the drawings, and particularly to Fig. 1, a piston and piston ring construction embodying the present invention includes a piston body 10 which may be of any suitable form. In the present instance the invention is shown as applied to the power piston section of a composite piston of the type used in "free piston" engines. The invention is particularly applicable to service of this nature for the reason that such engines have inherently high peak firing pressures.

The piston body 10 carries a cooling oil distributing head 12 to which oil inlet and discharge pipes 14 and 16 are attached, and a ring carrier 18 is disposed over and partially around the distributing head 12. The ring carrier 18 is provided with a plurality of axially spaced ring grooves 20 in which conventional piston rings are mounted. Conventional rings can be used at this point in the construction because the high peak firing pressures above the piston are greatly reduced by the ring construction of the present invention and are not exerted against the conventional rings in the grooves 20. The rings themselves are not shown in the drawings, but are inserted in the grooves 20 by conventionally expanding them over the outer diameter of the ring carrier and releasing them so that they snap into their grooves in the usual manner. Such rings are held out against the cylinder wall by their own resilience and by the gas pressure in the ring grooves behind them.

In the form shown in Fig. 1, the ring carrier 18 is provided with a forwardly extending centering flange 22 which cooperates with the adjacent surface of the carrier to form the bottom and one wall of a rectangular ring space designated generally 24 in Figs. 1 and 3. In the form shown in Fig. 3 the centering flange 22 is omitted.

The present invention provides a very heavy and relatively rigid piston ring 26 and a heavy backing spring 28, both mounted in the ring space 24. The ring 26 is, of course, split so that it may expand thermally, and any of the usual ring joints may be used between the ends of the split ring. The spring 28 is also split for thermal expansion and the joint between the ends of this member may be of the same type as selected for the ring 26 or of a different type, but in any event is circumferentially spaced from the joint in the ring. Preferably the two joints are 180° apart to minimize any leakage that might occur into the space 24 through them. Such spacing of the joints is indicated in Fig. 2.

Because of the relative inflexibility of the ring 26 and its backing spring 28 it is not feasible to snap them into the space 24 in the usual manner. For this reason the head of the piston is made removable. The head comprises a body 30, suitably formed with cooling passages 32 and provided with an inner skirt 34 that fits closely over the forwardly extending flange 22 of the ring carrier section, or flat against the upper surface of the ring carrier as shown in Fig. 3. Bolts 36 extend through the piston body 10, through the cooling oil distributing head 12 and through the ring carrier 18 to enter threaded holes in the piston head. The bolts 36 thus hold the elements of the piston in axially assembled relation in the form shown in Fig. 1, and both axially and radially in the form shown in Fig. 3. In the latter form, the radial locating function of the bolts 36 may be supplemented in any suitable manner.

The head 30 is provided with an O-ring seal 38 against the flat surface of the ring carrier for the purpose of preventing leakage of cooling oil radially out into the space 24.

It will be seen that the head 30 thus cooperates with the ring carrying body 18 to form the space 24 in which the piston ring 26 and its backing spring 28 are received. Conventional practice in mounting piston rings would permit the full peak firing pressure to be exerted in the space 24 behind the backing spring 28 and thus outwardly on the ring 26 tending to force this member against the cylinder wall. The present invention provides a flat, plate-type check valve 40 above the ring 26 and its backing spring 28 and this valve is urged against the upper sides of both the ring and spring by a series of small springs 42 received in recesses 44 in the head 30. Obviously, any suitable type of spring may be used to urge the valve plate 40 against the sides of the ring 26 and its backing spring.

Preferably, as shown in Fig. 3, the valve 40 also extends slightly above the space 24 and contacts an inwardly extending portion 46 of the body skirt 34 so as to seal off the upper portion of the space 24 both at its inner and outer sides. In this manner, the peak pressure is not only kept from the space 24 but as fully as possible the pressures are kept off the O-ring seal 38 and thus reduce distortion of this seal.

It will be appreciated that any pressure that accumulates in the space 24 by leakage of gas past the plate valve 40 will be dissipated out of the space 24 by opening of the valve whenever the pressure predominates over the pressure exerted against the exterior of the piston, as will occur when the piston is at the outer portion of its stroke and the cylinder pressures are greatly reduced.

In operation, the piston according to the present invention is assembled by placing the cooling oil distributing head 12 over the body 10, and the ring carrier section 18 over that. The ring 26 and its backing spring 28 are placed over the forwardly extending flange 22 of the ring carrier 18. The plate valve 40 is then assembled adjacent the ring 26 and its backing spring 28. The head 30 of the piston is then properly located with respect to the remaining elements and bolted in place by the bolts 36. When the piston is inserted in the cylinder the firing pressure acting behind the valve 40 tends to force the valve against the upper sides of the piston ring 26 and backing spring 28 and thus keep this pressure from entering the space 24 behind the ring and spring which are thus held out against the cylinder wall almost entirely by their own rigidity. The elements are dimensioned so that the pressures acting inwardly on the outer face of the ring 26 are insufficient to distort the heavy ring and its spring into the space 24 to any significant degree. It will thus be seen that the outward pressure is determined by the initial dimensions of the ring and spring and not by the firing pressures entering the ring groove as in the usual construction. In some instances the backing spring 28 may be omitted and a heavy ring 26 used alone. A sealed joint ring having sufficient rigidity to resist the gas pressure on the outside with low pressure in the groove behind it, and yet having the proper thermal expansion characteristics will sometimes suffice.

While the invention has been disclosed in conjunction with a specific form and disposition of the parts it should be expressly understood that various modifications and changes may be made therein without departing from the scope of the appended claims.

What I claim is:

1. In a piston for an internal combustion engine, the combination of, a ring carrying body, a removable piston head on said body, said head and body forming a perimetral ring groove therebetween, a relatively rigid piston ring in said groove, a relatively rigid backing spring in said groove behind said piston ring, and valve means carried by said head and cooperating with the sides of said ring and spring to seal off said groove when the pressure against the periphery of the piston exceeds the pressure in said groove.

2. In a piston for an internal combustion engine, the combination of, a ring carrying body, a removable piston head on said body, said head and body forming a perimetral ring groove therebetween, a relatively rigid piston ring in said groove, a relatively rigid backing spring in said groove behind said piston ring, and valve means disposed adjacent and cooperating with the sides of said ring and spring to seal off said groove when the pressure against the periphery of the piston exceeds the pressure in said groove.

3. In a piston for an internal combustion engine, the combination of, a ring carrying body, a removable piston head on said body, said head and body forming a perimetral ring groove therebetween, a relatively rigid piston ring in said groove, a relatively rigid backing spring in said groove behind said piston ring, and annular plate check valve means carried by said head and cooperating with the sides of said ring and spring to seal off said groove when the pressure against the periphery of the piston exceeds the pressure in said groove.

References Cited in the file of this patent

UNITED STATES PATENTS

| | | |
|---|---|---|
| 2,079,977 | Wenzel | May 11, 1937 |
| 2,395,847 | Clark | Mar. 5, 1946 |
| 2,396,084 | Clark | Mar. 5, 1946 |
| 2,621,092 | Clark | Dec. 9, 1952 |
| 2,719,767 | Ernest | Oct. 4, 1955 |